(12) United States Patent
Sunkavalli et al.

(10) Patent No.: US 11,194,490 B1
(45) Date of Patent: Dec. 7, 2021

(54) DATA FORMATTER FOR CONVOLUTION

(71) Applicant: Xilinx, Inc., San Jose, CA (US)

(72) Inventors: Ravi Sunkavalli, San Jose, CA (US);
Victor J. Wu, Sunnyvale, CA (US);
Poching Sun, San Jose, CA (US)

(73) Assignee: XILINX, INC., San Jose, CA (US)

( * ) Notice: Subject to any disclaimer, the term of this patent is extended or adjusted under 35 U.S.C. 154(b) by 885 days.

(21) Appl. No.: 15/956,594

(22) Filed: Apr. 18, 2018

(51) Int. Cl.
*G06F 3/06* (2006.01)
*G06F 7/523* (2006.01)
*G06F 16/901* (2019.01)

(52) U.S. Cl.
CPC ............ *G06F 3/0638* (2013.01); *G06F 3/061* (2013.01); *G06F 3/0656* (2013.01); *G06F 3/0673* (2013.01); *G06F 7/523* (2013.01); *G06F 16/901* (2019.01)

(58) Field of Classification Search
CPC ...... G06F 3/0638; G06F 3/061; G06F 3/0656; G06F 3/0673; G06F 7/523; G06F 16/901
USPC .............................................. 706/15; 708/607
See application file for complete search history.

(56) References Cited

U.S. PATENT DOCUMENTS

| | | | | |
|---|---|---|---|---|
| 4,967,340 A * | 10/1990 | Dawes | ............... | G06F 15/17343 712/19 |
| 8,924,455 B1 * | 12/2014 | Barman | ................ | G06F 7/5443 708/607 |
| 10,354,733 B1 * | 7/2019 | Zejda | ...................... | G06N 3/063 |
| 2013/0054862 A1 * | 2/2013 | Tsai | ...................... | H05K 5/0282 710/301 |
| 2015/0250934 A1 * | 9/2015 | Min | ....................... | G05B 15/02 623/3.11 |
| 2018/0307438 A1 * | 10/2018 | Huang | ..................... | G06F 5/065 |
| 2019/0171903 A1 * | 6/2019 | Vajda | ................... | G06K 9/3233 |

OTHER PUBLICATIONS

Sato, Kaz et al., "An in-depth look at Google's first Tensor Processing Unit (TPU)," May 12, 2017, 24 pp., https://cloud.google.com/blog/big-data/2017/05/an-in-depth-look-at-googles-first-tensor-processing-unit-tpu.

* cited by examiner

*Primary Examiner* — Prabodh M Dharia
(74) *Attorney, Agent, or Firm* — Crawford Maunu PLLC (57) ABSTRACT

A circuit arrangement includes a memory circuit, data upload circuitry, data formatting circuitry, and a systolic array (SA). The data upload circuitry inputs a multi-dimensional data set and stores the multi-dimensional data set in the memory circuit. The data formatting circuitry reads subsets of the multi-dimensional data set from the memory circuit. The data formatting circuitry arranges data elements of the subsets into data streams, and outputs data elements in the data streams in parallel. The SA includes rows and columns of multiply-and-accumulate (MAC) circuits. The SA inputs data elements of the data streams to columns of MAC circuits in parallel, inputs filter values to rows of MAC circuits in parallel, and computes an output feature map from the data streams and the filter values.

20 Claims, 7 Drawing Sheets

DATA FORMATTER FOR CONVOLUTION

TECHNICAL FIELD

The disclosure generally relates to formatting data for processing for convolution.

BACKGROUND

Some implementations of neural networks have a central processing unit (CPU) that preprocesses input data and specialized circuitry, such as graphics processing units (GPUs), application specific integrated circuits (ASICs), or programmable logic circuits that perform matrix multiplication. The preprocessing can entail formatting the data into a suitable form for matrix multiplication.

The processing overhead involved in preprocessing data can limit performance of the neural network. The circuitry involved in the preprocessing may be unable to supply the matrix multiplication circuitry with data at the rate at which the matrix multiplication circuitry can consume and process the data.

SUMMARY

A circuit arrangement includes a memory circuit, data upload circuitry, data formatting circuitry, and a systolic array (SA). The data upload circuitry is coupled to the memory circuit and is configured to input a multi-dimensional data set and store the multi-dimensional data set in the memory circuit. The data formatting circuitry is coupled to the memory circuit and is configured to read a plurality of subsets of the multi-dimensional data set from the memory circuit. The data formatting circuitry is further configured to arrange data elements of the plurality of subsets into a plurality of data streams, and output data elements in the plurality of data streams in parallel. The SA includes a plurality of rows and a plurality of columns of multiply-and-accumulate (MAC) circuits. The SA is coupled to the data formatting circuitry and is configured to input data elements of the plurality of data streams to a plurality of columns of MAC circuits in parallel, input filter values to a plurality of rows of MAC circuits in parallel, and compute an output feature map from the plurality of data streams and the filter values.

A method includes inputting a multi-dimensional data set to data upload circuitry and storing the multi-dimensional data set in a memory circuit. Data formatting circuitry reads a plurality of subsets of the multi-dimensional data set from the memory circuit and arranges data elements of the plurality of subsets into a plurality of data streams. The data formatting circuitry outputs data elements in the plurality of data streams in parallel, and the data elements are input in parallel to a plurality of columns of multiply-and-accumulate (MAC) circuits of a systolic array (SA). The SA inputs filter values to a plurality of rows of the MAC circuits of the SA in parallel and computes an output feature map from the plurality of data streams and the filter values.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuits and methods provide parallel and pipelined structures for loading and formatting matrix and filter data for matrix multiplication. Data upload circuitry inputs a multi-dimensional data set and stores the multi-dimensional data set in a memory circuit. Data formatting circuitry reads subsets of the multi-dimensional data set from the memory circuit and arranges data elements of the subsets into a plurality of data streams. The data formatting circuitry outputs data elements in the plurality of data streams in parallel. A systolic array (SA) includes multiple rows and columns of multiply-and-accumulate (MAC) circuits. The SA inputs data elements of the data streams to a plurality of columns of MAC circuits in parallel, inputs filter values to rows of MAC circuits in parallel, and computes an output feature map from the data streams and the filter values.

Figures 1, 2:
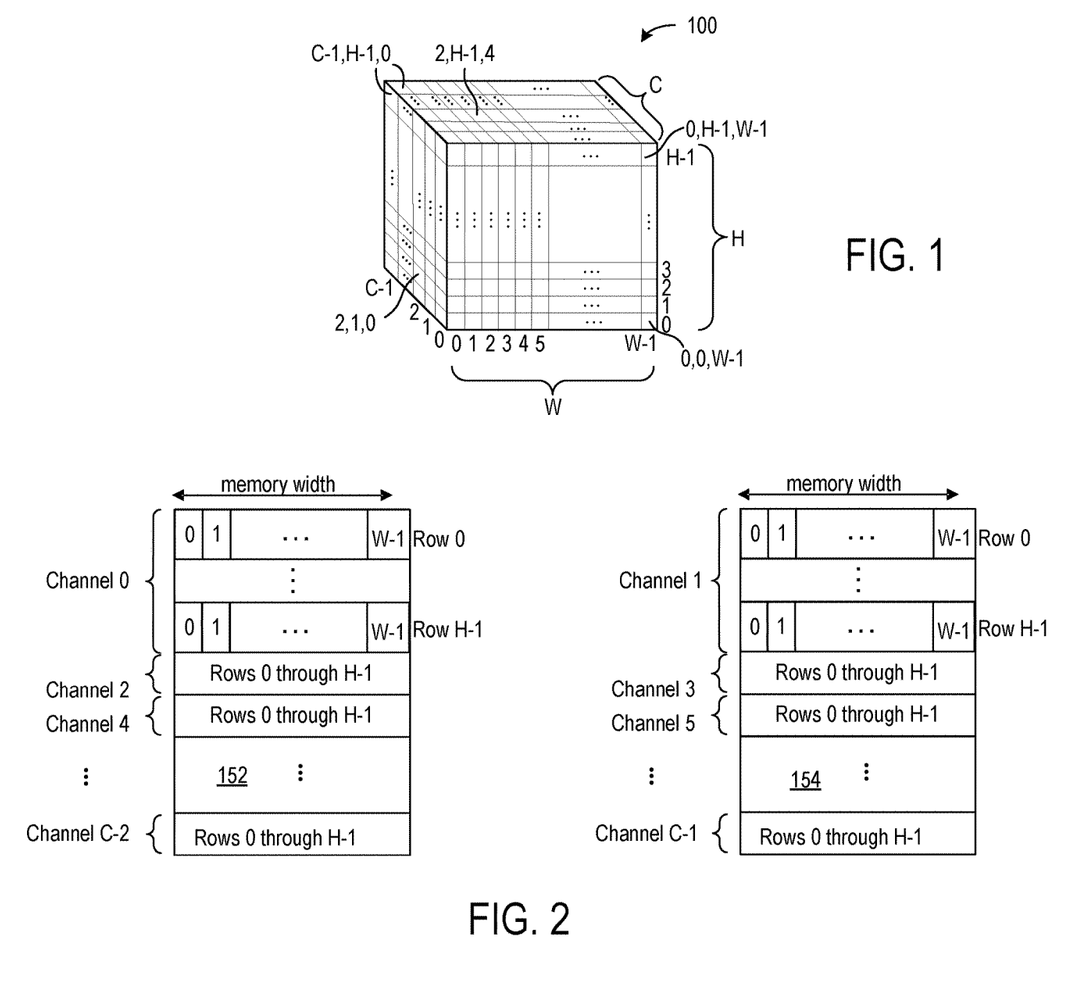
FIG. 1 shows and exemplary three-dimensional input data set.
FIG. 2 shows the format of an input data set and storage of even numbered channels in one memory and storage of odd numbered channels in another memory.

FIG. 1 shows and exemplary three-dimensional input data set 100. In an application, such as the processing of image data, the dimensions can be referenced as width, height, and channels. Other applications may have additional dimensions. The exemplary input data set has a width W, a height H, and C channels. The width dimension is indexed 0 through W−1, the height dimension is indexed 0 through H−1, and the channel dimension is indexed 0 through C−1.

FIG. 2 shows the format of an input data set and storage of even numbered channels in one memory 152 and storage of odd numbered channels in another memory 154. Data elements of channels 0, 2, 4, . . . , C−2 are stored in memory 152, and data elements of channels 1, 3, 5, . . . , C−1 are stored in memory 154.

Data elements of the data set are stored in row-major order in the memories. Rows of data elements are stored in order of the height index 0 through H−1, and within each row data elements are ordered by the width index 0 through W−1.

Figure 3:
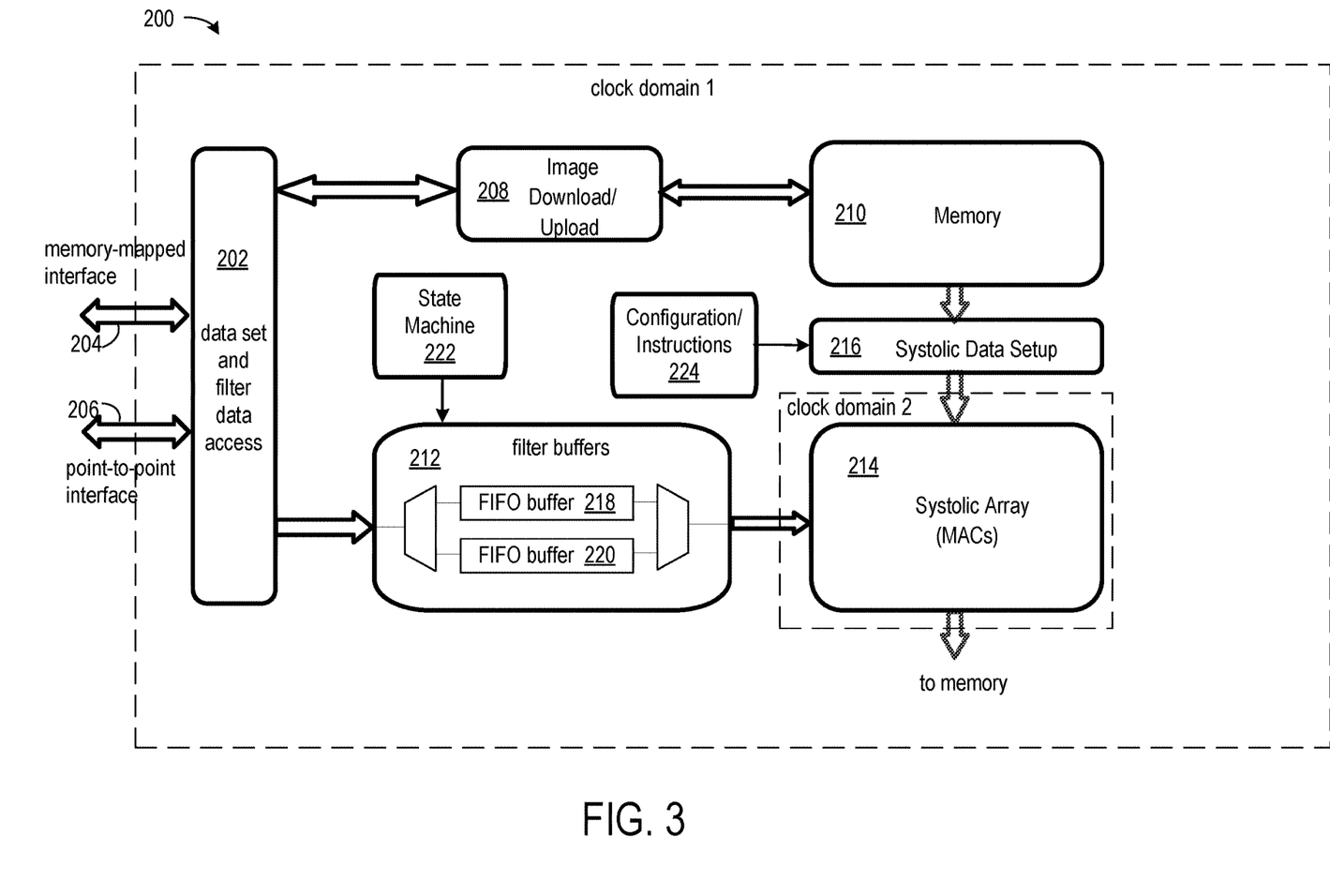
FIG. 3 shows a circuit arrangement in which a multi-dimensional data set is formatted for parallel input to a systolic array (SA) for processing.

FIG. 3 shows a circuit arrangement 200 in which a multi-dimensional data set is formatted for parallel input to a systolic array (SA) for processing. In an exemplary application, the circuit arrangement performs convolution of an input data set with filter data. Circuit 202 provides communications on memory-mapped and point-to-point interfaces 204 and 206 for accessing an input data set and the filter data to be applied to the input data set. An exemplary application processes an input data set containing image data, and the input data set may be referenced as "image data" elsewhere in this description. Circuit 208 initiates input of the data set and filter data with the access circuit 202 and enables storage of the input data set in the image memory 210 and storage of the filter data in the filter buffers 212. Circuit 208 further controls downloading of data that have been processed by the SA 214 and written back to the memory 210.

Set-up circuit 216 reads data elements of the input data set from the memory 210 and formats the input data set into parallel streams of data elements for processing by the systolic array (SA) 214. The circuit arrangement 200 operates within two clock domains, and the data set-up circuitry prepares data of two channels in parallel, which allows the SA to operate at a faster clock speed than the other circuitry of the circuit arrangement 200 and not have to wait for data elements to process.

State machine 222 controls loading of filter data into filter buffers 212. Filter buffers 212 include two separate FIFO buffers 218 and 220. The filter data is loaded from memory external to the circuit arrangement 200 into FIFO buffers 218 and 220. To conserve memory usage, such as block memories on a field programmable gate array (FPGA) yet achieve optimum parallelization, the filter window data for multiple (e.g., 32) output filters are loaded at a time into one of the FIFO buffers 218 or 220. The SA 214 begins to consume filter values once one of the FIFO buffers (e.g., 218) is fully loaded. In parallel, the next set of filters are loaded into the second FIFO buffer (e.g., 220), and the next set of filters (e.g., in FIFO buffer 220) will be used when the filters in the current FIFO buffer (e.g., 218) are exhausted. State machine 222 controls the population and depopulation and the back-and-forth scheduling of the two filter buffers 218 and 220.

The SA 214 is composed of an array of multiply-and-accumulate (MAC) circuits. In an exemplary implementation, the height dimension is fixed (e.g., 32 rows) and corresponds to the channel dimension of an output image. In other words, each row of MAC circuits is computing W pixels of an output channel. The width dimension (W) of the SA corresponds directly to the width dimension of the output image (e.g., 28 columns). In one implementation, the width dimension can be a compile-time parameter that can be sized to best match the features of a given neural network.

When all the data elements of the input data set (e.g., a convolution window) have been processed, the SA 214 produces a block of the output volume of size 1 (row)× SA_WIDTH (column)×SA_HEIGHT (depth). As the output volume block is shifted out of the array and written back into the memory 210, data elements for computing the next output volume chunk are loaded into the SA in parallel to maximize utilization of the SA. A state machine tracks the overall progress until the entire output image volume is completed.

The configuration/instructions circuit 224 can be a memory or other storage circuit for specifying operational parameters such as the different dimensions, the size of the convolution window, and the stride, for example.

Figure 4:
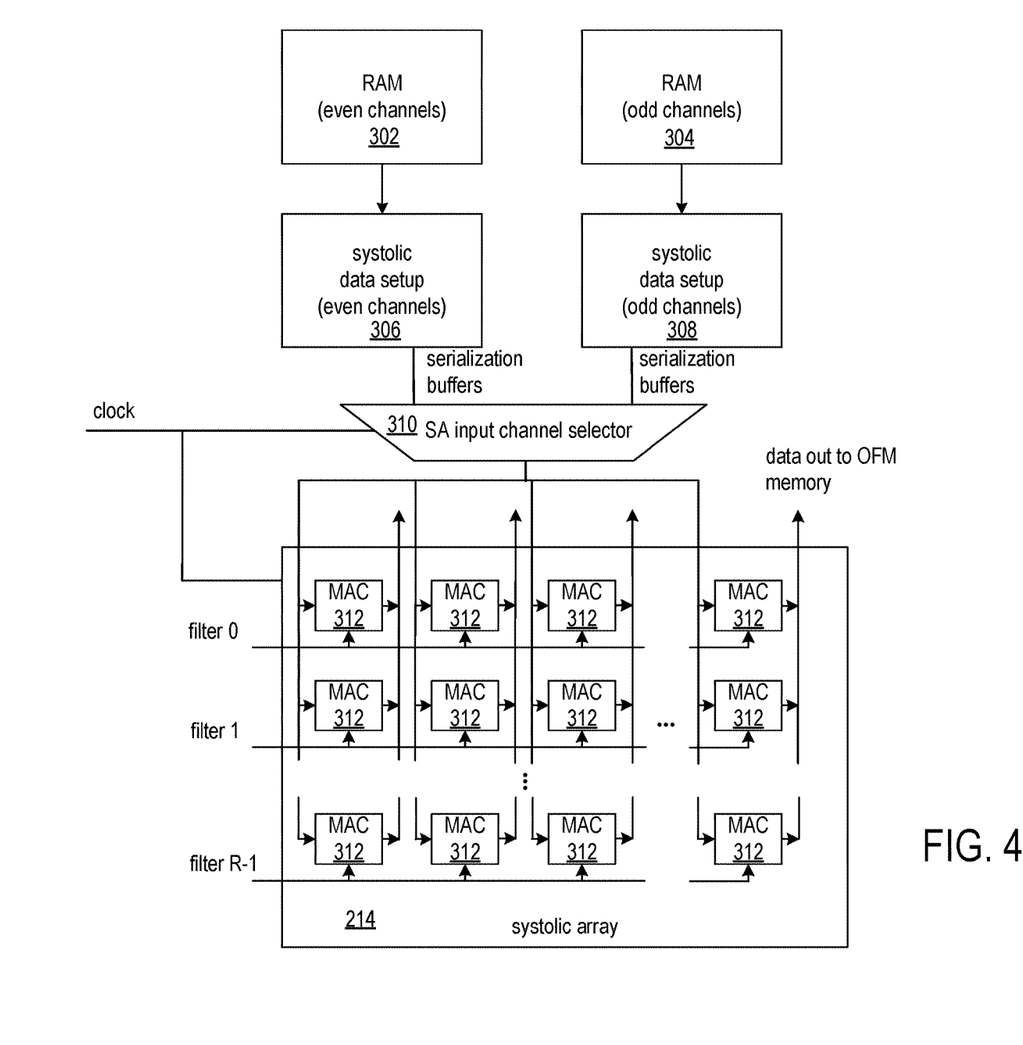
FIG. 4 shows circuitry that formats even and odd channels of a multi-dimensional data set into parallel serialization buffers for input to the SA for processing.

FIG. 4 shows circuitry that formats even and odd channels of a multi-dimensional data set into parallel serialization buffers for input to the SA 214 for processing. The input data set is partitioned and stored in RAMs 302 and 304. Data elements at even numbered indices of one dimension, for example, even numbered channels, are stored in RAM 302, and data elements at odd numbered indices of that dimension, for example odd numbered channels, are stored in RAM 304. Each of the RAMs is separately addressable by a respective one of the setup circuits 306 and 308.

Setup circuit 306 reads data elements from RAM 302 and generates serialization buffers for input to the SA 214, and in parallel with set up circuit 306 reading data elements and generating serialization buffer, setup circuit 308 reads data elements from RAM 304 and generates additional serialization buffers for input to the SA. The number of serialization buffers in each set is equal to the number of columns of MAC circuits 312 in the SA. Selector circuit 310 selects between the sets of serialization buffers provided by setup circuits 306 and 308. For example, for a first cycle of processing by the SA, the selector circuit 310 selects the serialization buffers from the setup circuit 306 (even channel data elements), and in the next cycle of the SA, the selector circuit selects the serialization buffers from the set up circuit 308 (odd channel data elements). The setup circuits 306 and 308 can run at one-half the clock frequency of the SA, which allows selection of the odd-channel and even-channel serialization buffers on alternating clock cycles of the SA.

The data elements in the selected set of serialization buffers are input to the SA 214 by shifting data elements from each serialization buffer in the selected set into one of the columns of MAC circuits. As data elements from the serialization buffers are shifted into columns of MAC circuits, filters are is shifted into the rows of MAC circuits. The filters are numbered 0 through R−1, and each filter includes a set of filter values. Filter 0 is shifted into the first row of MACs, filter 1 is shifted into the second row of MACs, . . . , and filter R−1 is shifted into the Rth row of MACs. The data elements are shifted through each column from row-to-row and are reused for a different output-channel filter in each row. In this manner, each iteration through the systolic array produces C pixel results for R output channels.

Figure 5:
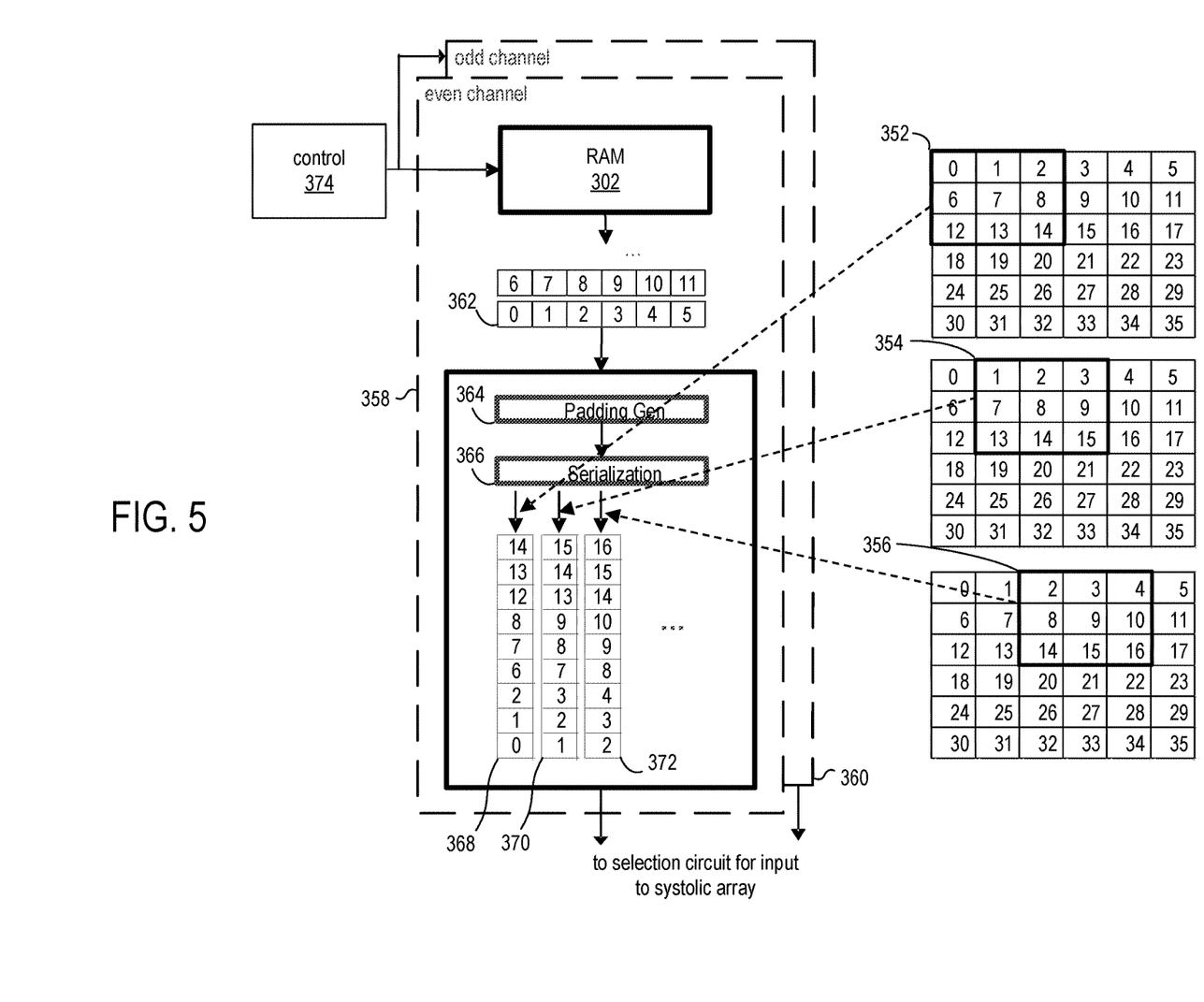
FIG. 5 shows formatting of windows of an exemplary input data set into parallel data streams for input to an SA.

FIG. 5 shows formatting of windows of an exemplary input data set into parallel data streams for input to an SA. A convolution operation involves convolving a set of filter elements with multiple "windows" or sub-blocks of an input data set. The data elements of the input data set are formatted to match the dimensions of the filter window before inputting the data elements into the SA. The disclosed circuits and methods minimize the number of reads from the image memory by preparing multiple convolution "windows" of image data in parallel for every set of data elements (or "block") read from image memory. To prepare the convolution image "windows", a series of shifting-buffers are used to buffer the data elements read from memory, generate the appropriate padding, and format the data correctly for each MAC circuit of the SA for parallel processing. The first set of shifting buffers pads the image borders (in case the convolution window lands outside the image border), and the second shifting buffer is used to convert the image "windows" into parallel streams of image pixels into the SA. This approach is efficient for large "windows" of image data because it can achieve a multiply and accumulate operation every cycle for every MAC circuit.

The example of FIG. 5 shows three windows 352, 354, and 356 of an even channel of an input data set. Data elements of the even numbered channels of the input data set are stored in RAM 302, and data elements of the odd numbered channels of the input data set are stored in RAM 304 (FIG. 4). Dashed block 358 represents the circuitry and processing of the even channel data, and dashed block 360 represents the circuitry and formatting of the odd channel data in parallel with the formatting of the even channel data.

The serialization results in each window of data elements being arranged in a respective FIFO buffer in row-major order so that the data elements of the window can be shifted into a column of MAC circuits in the SA. Data elements 0, 1, 2, 6, 7, 8, 12, 13, and 14 of window 352 are serialized into FIFO buffer 368; data elements 1, 2, 3, 7, 8, 9, 13, 14, and 15 of window 354 are serialized into FIFO buffer 370; and data elements 2, 3, 4, 8, 9, 10, 14, 15, and 16 are serialized into FIFO buffer 372. The FIFO buffers 368, 370, and 372 implement the serialization buffers that are input to the selector circuit 310 in FIG. 4.

Each read of the input data set returns multiple data elements of a row of the data set, and the data elements read appear in multiple windows. In the example, a single read operation can read data elements 0, 1, 2, 3, 4, and 5 of the first row into register 362. Data element 0 appears in window 352; data element 1 appears in windows 352 and 354; data element 2 appears in windows 352, 354, and 356; data element 3 windows 354 and 356; and data element 4 appears in window 356. Control circuit 374 can be a state machine that controls reading data elements from the RAMs 302 and 304 for processing by the circuit 364.

Circuit 364 introduces padding values in to the row of data elements if needed. For example, circuit 364 can shift right the values of the row and input 0 values as pad values to the shift register for a window that extends beyond the available data elements. Note that no padding is necessary in the present example.

Circuit 366 serializes the data elements provided by the circuit 364 into multiple FIFO buffers, three of which are shown as 368, 370, 372. The serialization circuit shifts data elements 0, 1, and 2 into FIFO buffers 368, 370, and 372, respectively. Then the serialization circuit shifts the data elements left, which results in data elements 1, 2, and 3 being available to shift into the FIFO buffers 368, 370, and 372. Data elements 1, 2, and 3 are shifted into the FIFO buffers 368, 370, and 372, respectively, and the shift left and pushing values is repeated for data elements 2, 3, and 4. Though not shown, it will be appreciated that the process can involve processing additional windows (not shown) in the first row of the data set into additional FIFO buffers. Once serialization of the first row is complete, data elements of the second row (6, 7, 8, 9, 10, 11) are read and serialized into the FIFO buffers 368, 370, and 372 as described above.

The FIFO buffers 368, 370, and 372 are coupled to output data elements stored therein to the selector circuit 310 of FIG. 4.

Figure 6:
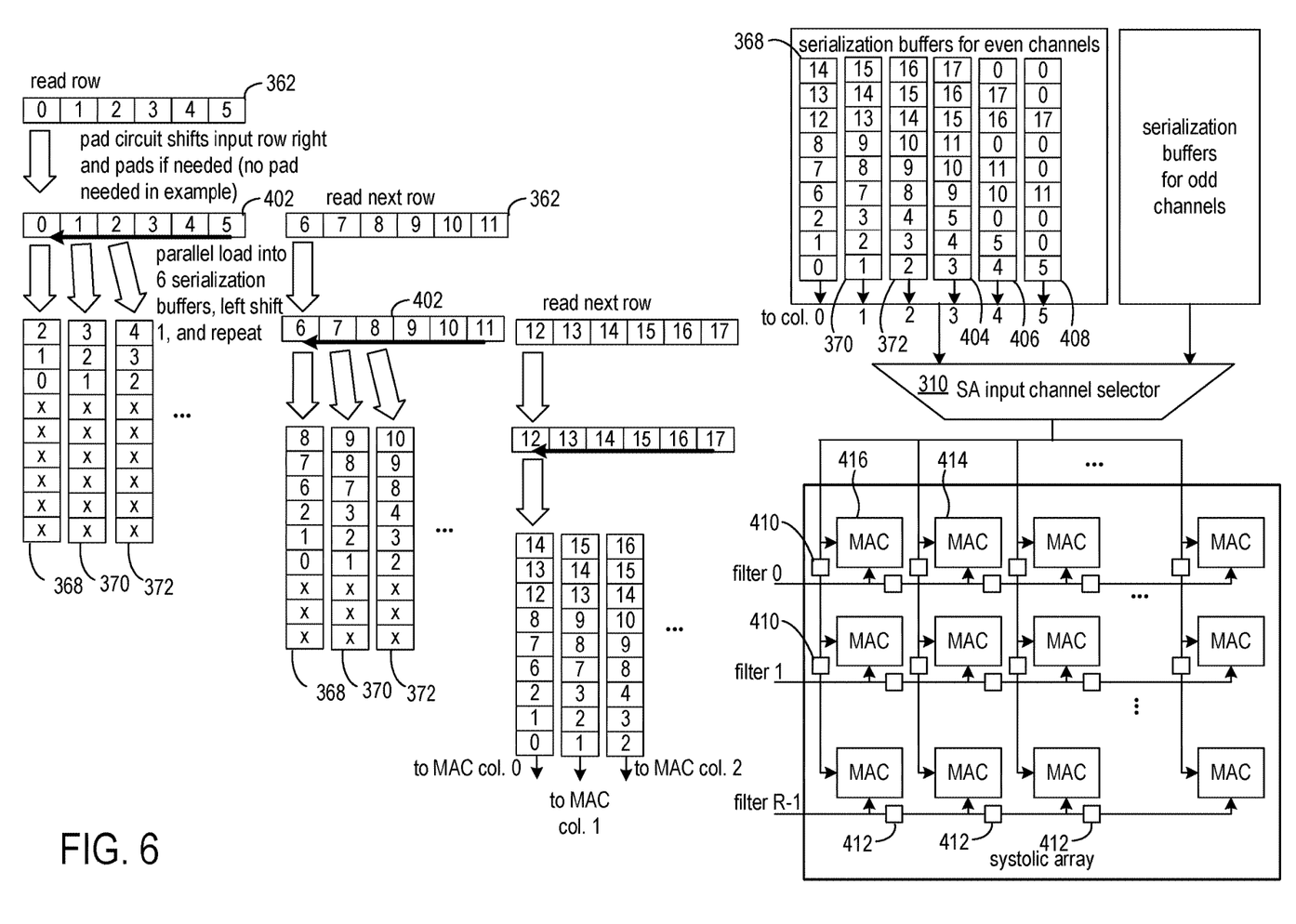
FIG. 6 further illustrates the reading, shifting, and serialization based on the example of FIG. 5.

FIG. 6 further illustrates the reading, shifting, and serialization based on the example of FIG. 5. A first row of data elements 0, 1, 2, 3, 4, 5 is read into register 362. The data elements can be shifted right in the register if padding is needed (not needed in the example). The data elements from register 362 are put in register 402 for serialization. Parallel taps from the register 402 are connected to the inputs of FIFO buffers 368, 370, and 372. Data element 0 is shifted into FIFO buffer 368, data element 1 is shifted into FIFO buffer 370, data element 2 is shifted into FIFO buffer 372, etc. After the first set of data elements has been shifted into the FIFO buffers, the data elements in the register 402 are shifted left, and the next set of data elements (1, 2, and 3) is shifted into the FIFO buffers as shown. The process is repeated until all the data elements in the register 402 have been shifted into the FIFO buffers for the windows occupied by the data elements.

The next row of data elements 6, 7, 8, 9, 10, 11 can be read into the register 362 and padded as the data elements 0, 1, 2, 3, 4, 5 are shifted into the FIFO buffers. The row of data elements 6, 7, 8, 9, 10, 11 does not need padding and is provided to left shift register 402. The data elements 6, 7, 8, 9, 10, 11 are stored into the FIFO buffers as shown, following the process described above. The process is similarly repeated for the next row of data elements 12, 13, 14, 15, 16, 17.

The serialization buffers for the even channels and serialization buffers for the odd channels are input to the selector circuit 310 as described above. The prepared vectors are shifted in parallel from the FIFO buffers 368, 370, 372, 404, 406, and 408 into columns 0, 1, 2, 3, 4, and 5 of the SA. The data elements for each column flow down the columns from row-to-row and are reused for different output-channel filters. The data elements are shifted through registers 410 in the columns, and the filter values are shifted through registers 412 in the rows. In this manner, C pixel results are produced for R output channels for each iteration through the systolic array.

The data element inputs flow into the array in a staggered manner, such that the data elements input for each row are delayed one additional cycle relative to the row above. Additionally, each row's input flows in from left-to-right, pipelined at every SA column. Similarly, the column inputs will also be staggered such that the inputs for each column will be delayed one additional cycle relative to the column to the left of it. For example, data element 1 is shifted into MAC circuit 414 one cycle after data element 0 is shifted into MAC circuit 416. Each column's inputs will flow in from top-to-bottom, pipelined at every SA row.

Figure 7:
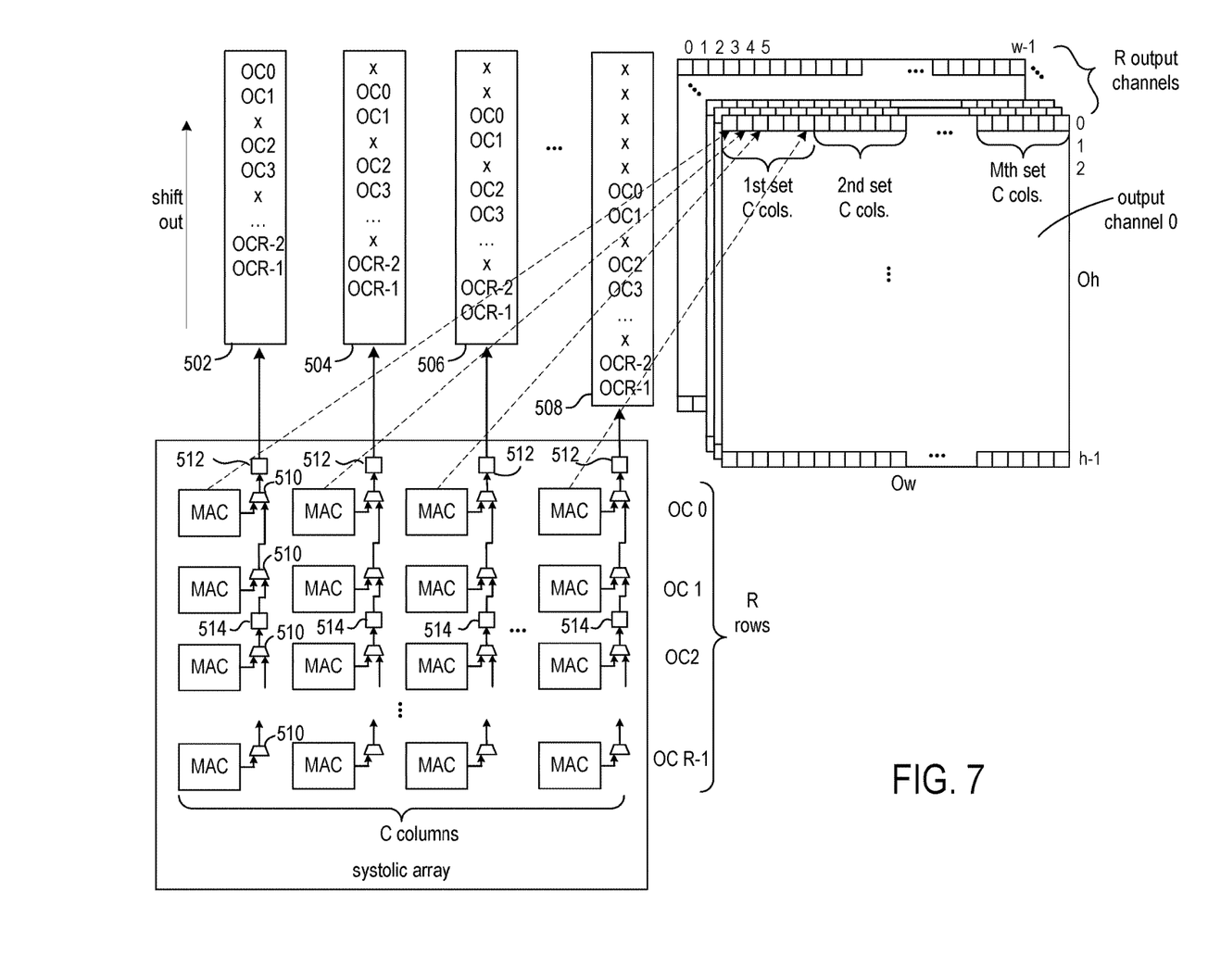
FIG. 7 shows output circuitry of the SA, ordering of output values, and mapping of output values to an output feature map.

FIG. 7 shows output circuitry of the SA, ordering of output values, and mapping of output values to an output feature map. Each row of MAC circuits computes C pixels for one of the R output channels. R is also is the number of rows of MAC circuits in the SA. The MAC circuits perform in-place accumulation, where the accumulated results are only fed back into the same MAC circuit and are not shared with other surrounding MAC circuits. Each MAC circuit performs a multiply-and-accumulate operation (MACCOP) in every cycle of the SA. The total number of MACCOPs each MAC circuit will perform before the final accumulated result can be output from the SA and stored in memory is equal to the dimensions of the filter volume, which can be defined as N=(window_width*window_height*R). Note that in convolution operations, the "window" is also referred to as a "kernel."

Because of the systolic nature of the array, each MAC circuit performs its final MACCOP one cycle later than the MAC circuit immediately left of or above its position. In order to alleviate timing issues, the accumulated results of each MAC circuit in a column are pipelined at every other row as the results are shifted toward the top of the SA. The pipelining at every other row is implemented by pipeline registers that capture the output of every other row. In this manner, the results output from the top of column 0 (column 0 denoted "C0"), for example, for channels 0 through R-1 (channels denoted as OC0, OC1, . . . , OCR-1) are in the pattern of C0.OC0, C0.OC1, x, C0.OC2, C0.OC3, x, . . . C0.OCR-2, C0.OCR-1, x ('x' represents a dead cycle with no valid data). The data output from column 1 to the right of column 0 will be staggered by one cycle, so they will appear as x, C1.OC0, C1.OC1, x, . . . C1.OCR−2, C1.OCR−1, x. The results from other columns are similarly staggered.

The resulting data shifted out of each column can be stored in separate column FIFO buffers 502, 504, 506, . . . , 508 in order to eliminate the staggered effect of the data. Once the first valid data appears for C0.OC0, C−1 cycles later the complete results of C output data elements for OC0 are available, the following cycle C output data elements for OC1 are available, etc. A complete set of C output data elements can be obtained for writing to the memory by tapping outputs of staggered entries in the FIFO buffers 502, 504, 506, . . . , 508.

Each column of MAC circuits shares a data bus to output the column results. The output from each MAC circuit is input to a MUX circuit that selects the data from the current MAC circuit in the same row as the MUX circuit or the data from the MAC circuit in the row below. For example, the MUXes of column 0 are shown as MUXes 510. The SA includes a register at every other row of MAC circuits in order to satisfy physical timing requirements. For example, row 0 produces values for channel 0, and the results are captured in pipeline registers 512; row 2 produces values for channel 2, and the results are captured in pipeline registers 514 etc. Each register breaks-up the load each MAC circuit has to drive. In a worst case, the MAC circuit in row R−1 would have to drive its results all the way to the top of the column in one cycle and propagate through R−1 MUX circuits. The added registers reduce the number of MUX circuits a MAC circuit drives to two. This results in the pattern of the output data elements from column 0 as OC0, OC1, x, OC2, OC3, x, . . . .

Once a MAC circuit has shifted out its accumulated result, performing the next batch of N MACCOPs on a new data set can commence, even while the other surrounding MAC circuits are shifting out their final accumulated results from the previous data set. This pipelining effect maximizes the utilization efficiency of the DSP's.

Figure 8:
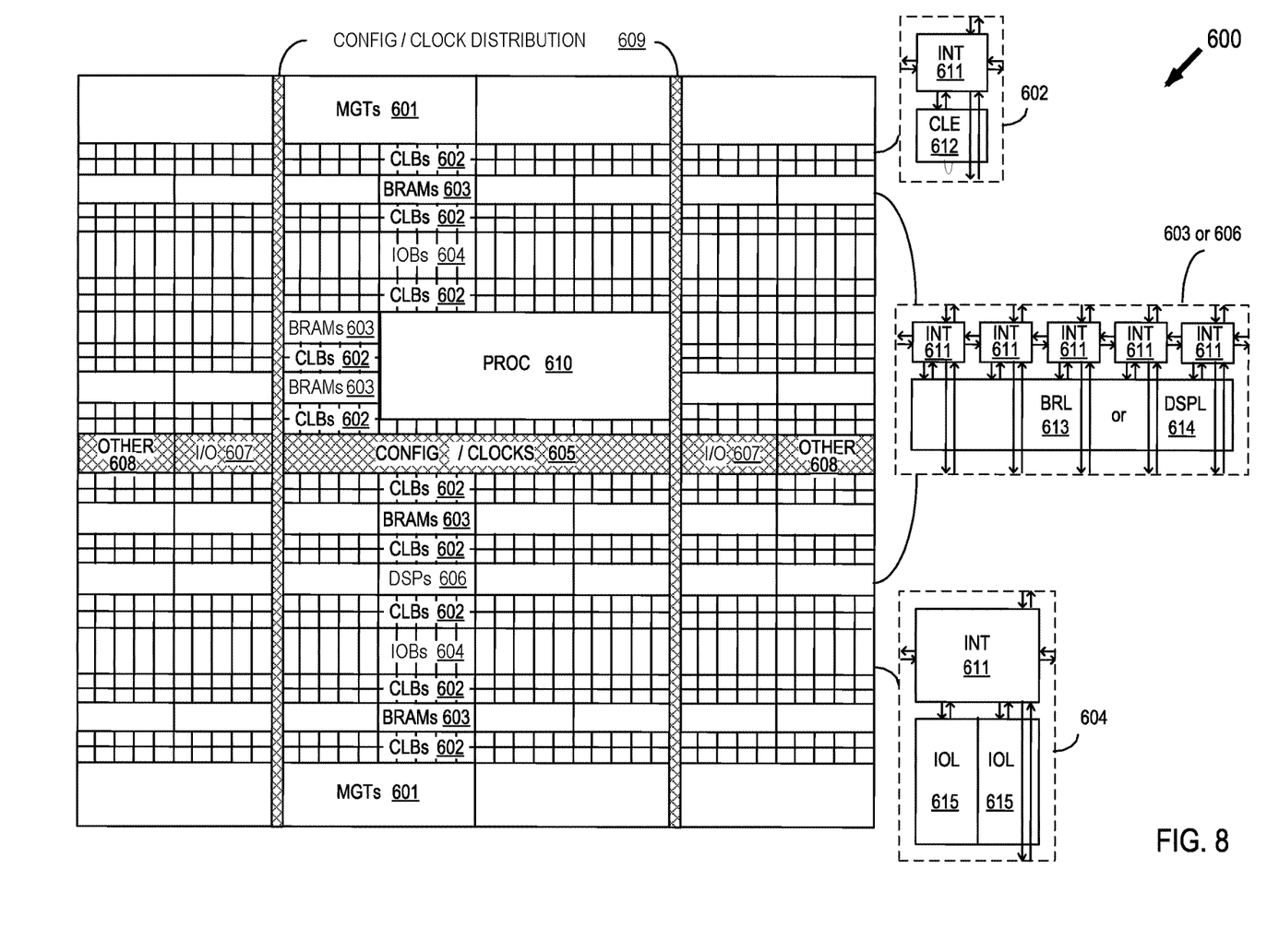
FIG. 8 shows a programmable integrated circuit (IC) on which the disclosed circuits and processes may be implemented.

FIG. 8 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 8.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

A columnar area near the center of the die (shown shaded in FIG. 8) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 610 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for formatting data for performing convolution operations. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
   a random access memory (RAM);
   a first logic circuit coupled to the RAM and configured to
      input a multi-dimensional data set and store the multi-dimensional data set in the RAM, the multi-dimensional data set includes data elements organized in pluralities of rows and columns;
a second logic circuit coupled to the RAM and configured to:
read a plurality of subsets of data elements of the multi-dimensional data set from the RAM,
arrange data elements of the plurality of subsets into a plurality of data streams, and
output data elements in the plurality of data streams in parallel; and
a systolic array (SA) of multiply-and-accumulate (MAC) circuits coupled to the second logic circuit and including a plurality of rows and a plurality of columns of MAC circuits, the SA configured to:
input data elements of the plurality of data streams to a plurality of columns of MAC circuits in parallel,
input filter values to a plurality of rows of MAC circuits in parallel, and
compute an output feature map from the plurality of data streams and the filter values.

2. The circuit arrangement of claim 1, wherein:
the RAM includes a first RAM and a second RAM;
the first logic circuit is further configured to store data elements indexed by an odd value in one dimension of the multi-dimensional data set in the first RAM and store data elements indexed by an even value in the one dimension in the second RAM; and
the second logic circuit is further configured to read data elements of the multi-dimensional data set from the first RAM in parallel with data elements of the multi-dimensional data set from the second RAM.

3. The circuit arrangement of claim 2, wherein:
the plurality of data streams includes a first subset of data streams and a second subset of data streams; and
the second logic circuit is further configured to arrange the first subset of data streams and arrange the second subset of data streams concurrently.

4. The circuit arrangement of claim 2, further comprising:
a selection circuit coupled to receive the data elements from the second logic circuit and output data elements to the plurality of columns of MAC circuits;
wherein:
the second logic circuit includes a first setup circuit and a second setup circuit;
the first setup circuit is coupled to the first RAM and is configured to:
read data elements of the multi-dimensional data set from the first RAM, and
shift the data elements into a first plurality of FIFO buffers;
the second setup circuit is coupled to the second RAM and is configured to:
read data elements of the multi-dimensional data set from the second RAM, and
shift the data elements into a second plurality of FIFO buffers; and
the selection circuit is further configured to alternate between selection of data elements from the first plurality of FIFO buffers and data elements from the second plurality FIFO buffers for input to the plurality of columns of MAC circuits.

5. The circuit arrangement of claim 4, wherein the first setup circuit is configured to operate in parallel with the second setup circuit.

6. The circuit arrangement of claim 4, wherein:
the first setup circuit is configured to shift a plurality of data elements into the first plurality of FIFO buffers in parallel; and
the second setup circuit is configured to shift a plurality of data elements into the second plurality of FIFO buffers in parallel.

7. The circuit arrangement of claim 1, wherein the second logic circuit is configured to operate at a first clock rate, and the SA is configured to operate at a second clock rate that is faster than the first clock rate.

8. The circuit arrangement of claim 1, further comprising:
a filter control circuit coupled to the plurality of rows of the MAC circuits of the SA;
a first filter buffer circuit coupled to the filter control circuit;
a second filter buffer circuit coupled to the filter control circuit; and
wherein the filter control circuit is configured to select filter values from the first filter buffer circuit for input to the plurality of rows of the MAC circuits while enabling writing of input filter values to the second filter buffer circuit, and select filter values from the second filter buffer circuit for input to the plurality of rows of the MAC circuits while enabling writing of input filter values to the first filter buffer circuit.

9. The circuit arrangement of claim 8, wherein the second logic circuit is configured to operate at a first clock rate, and the SA is configured to operate at a second clock rate that is faster than the first clock rate.

10. The circuit arrangement of claim 1, wherein:
the multi-dimensional data set includes a row having W data elements, the SA array includes N columns, and N=W; and
the second logic circuit is configured to arrange each row of data elements in parallel in N data streams.

11. A method comprising:
inputting a multi-dimensional data set to a first logic circuit and storing the multi-dimensional data set in a random access memory (RAM), the multi-dimensional data set includes data elements organized in pluralities of rows and columns;
reading data elements of a plurality of subsets of the multi-dimensional data set from the RAM by data formatting circuitry;
arranging data elements of the plurality of subsets into a plurality of data streams by the second logic circuit;
outputting data elements in the plurality of data streams in parallel by the second logic circuit;
inputting data elements of the plurality of data streams in parallel to a plurality of columns of multiply-and-accumulate (MAC) circuits of a systolic array (SA);
inputting filter values to a plurality of rows of the MAC circuits of the SA in parallel;
computing an output feature map from the plurality of data streams and the filter values.

12. The method of claim 11, wherein:
the storing the multi-dimensional data set in the RAM includes storing data elements indexed by an odd value in one dimension of the multi-dimensional data set in a first RAM and storing data elements indexed by an even value in the one dimension in a second RAM; and
the reading includes reading data elements of the multi-dimensional data set from the first RAM in parallel with data elements of the multi-dimensional data set from the second RAM by the second logic circuit.

13. The method of claim 12, wherein the plurality of data streams includes a first subset of data streams and a second subset of data streams, and the arranging includes arranging the first subset of data streams and arrange the second subset of data streams concurrently by the second logic circuit.

14. The method of claim 12, further comprising:
reading data elements of the multi-dimensional data set from the first RAM by a first setup circuit;
shifting the data elements read by the first setup circuit into a first plurality of FIFO buffers;
reading data elements of the multi-dimensional data set from the second RAM by a second setup circuit;
shifting the data elements read by the second setup circuit into a second plurality of FIFO buffers;
alternating between selection of data elements from the first plurality of FIFO buffers and data elements from the second plurality FIFO buffers by a selection circuit for input to the plurality of columns of MAC circuits.

15. The method of claim 14, wherein the reading and shifting by the first setup circuit are performed in parallel with the reading and shifting by the second setup circuit.

16. The method of claim 14, wherein:
the shifting by the first setup circuit includes shifting a plurality of data elements into the first plurality of FIFO buffers in parallel; and
the shifting by the second setup circuit includes shifting a plurality of data elements into the second plurality of FIFO buffers in parallel.

17. The method of claim 11, further comprising operating the second logic circuit at a first clock rate and operating the SA at a second clock rate that is faster than the first clock rate.

18. The method of claim 11, further comprising:
selecting filter values from a first filter buffer circuit by a filter control circuit for input to the plurality of rows of the MAC circuits while enabling writing of input filter values to a second filter buffer circuit; and
selecting filter values from the second filter buffer circuit by the filter control circuit for input to the plurality of rows of the MAC circuits while enabling writing of input filter values to the first filter buffer circuit.

19. The method of claim 18, further comprising operating the second logic circuit at a first clock rate and operating the SA at a second clock rate that is faster than the first clock rate.

20. The method of claim 11, wherein:
the multi-dimensional data set includes a row having W data elements, the SA array includes N columns, and N=W; and
the method further comprising arranging each row of data elements in parallel in N data streams by the second logic circuit.

* * * * *